US009253231B2

(12) United States Patent
O'Callaghan

(10) Patent No.: US 9,253,231 B2
(45) Date of Patent: Feb. 2, 2016

(54) RETRIEVING AND CACHING ADAPTIVE BITRATE STREAM SEGMENTS BASED ON NETWORK CONGESTION

(71) Applicant: Verizon Patent and Licensing Inc., Basking Ridge, NJ (US)

(72) Inventor: Daniel J. O'Callaghan, Fairfax Station, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/134,069

(22) Filed: Dec. 19, 2013

(65) Prior Publication Data
US 2015/0180924 A1    Jun. 25, 2015

(51) Int. Cl.
*H04L 12/26* (2006.01)
*H04L 29/06* (2006.01)
*H04L 12/801* (2013.01)

(52) U.S. Cl.
CPC ........ *H04L 65/4084* (2013.01); *H04L 43/0829* (2013.01); *H04L 47/10* (2013.01); *H04L 65/605* (2013.01); *H04L 65/80* (2013.01)

(58) Field of Classification Search
CPC ... H04L 47/00; H04L 65/60; H04W 28/0284; H04N 21/2662
USPC ......................................................... 709/219
See application file for complete search history.

(56) References Cited

U.S. PATENT DOCUMENTS

| 7,831,730 | B1* | 11/2010 | Markowitz et al. ........... 709/231 |
| 8,046,432 | B2* | 10/2011 | Yoo et al. ..................... 709/217 |
| 8,396,983 | B1* | 3/2013 | Inskip ............... H04L 29/06517 709/203 |
| 8,750,123 | B1* | 6/2014 | Alisawi ......................... 370/235 |
| 2004/0215746 | A1* | 10/2004 | McCanne et al. ............. 709/219 |
| 2005/0262257 | A1* | 11/2005 | Major et al. .................. 709/231 |
| 2008/0191816 | A1* | 8/2008 | Balachandran et al. ..... 333/24 R |
| 2011/0035507 | A1* | 2/2011 | Brueck et al. ................. 709/231 |
| 2011/0106969 | A1* | 5/2011 | Choudhury et al. .......... 709/236 |
| 2012/0023254 | A1* | 1/2012 | Park et al. ..................... 709/231 |
| 2012/0102184 | A1* | 4/2012 | Candelore ..................... 709/224 |
| 2012/0284371 | A1* | 11/2012 | Begen et al. .................. 709/219 |
| 2012/0317308 | A1* | 12/2012 | Penner et al. ................. 709/239 |
| 2014/0019590 | A1* | 1/2014 | Piernot et al. ................. 709/217 |
| 2014/0059156 | A1* | 2/2014 | Freeman, II ............ H04L 67/10 709/213 |

(Continued)

OTHER PUBLICATIONS

Wikipedia, "Adaptive bitrate streaming", http://en.wikipedia.org/wiki/Adaptive_bitrate_streaming, Oct. 3, 2013, 6 pages.

(Continued)

*Primary Examiner* — Brian J Gillis
*Assistant Examiner* — Matthew Ballard

(57) ABSTRACT

A cache device may receive a request for a first segment of an adaptive bitrate stream. The request may identify a particular time interval, of the adaptive bitrate stream, to which the first segment corresponds. The request may further identify a first bitrate at which the first segment is encoded. The cache device may determine a network congestion level of a network associated with the adaptive bitrate stream. The cache device may determine, based on the network congestion level, a second bitrate that is different from the first bitrate. The cache device may obtain a second segment of the adaptive bitrate stream. The second segment may be encoded at the second bitrate. The cache device may store the second segment for delivery to a client device.

20 Claims, 13 Drawing Sheets

(56) References Cited

U.S. PATENT DOCUMENTS

| | | | |
|---|---|---|---|
| 2014/0082192 A1* | 3/2014 | Wei | H04W 28/0231 709/224 |
| 2014/0161050 A1* | 6/2014 | Grinshpun et al. | 370/329 |
| 2014/0281009 A1* | 9/2014 | Moorthy et al. | 709/231 |

OTHER PUBLICATIONS

Wikipedia, "Dynamic Adaptive Streaming over HTTP", http://en.wikipedia.org/wiki/Dynamic_Adaptive_Streaming_over_HTTP, Oct. 28, 2013, 3 pages.

* cited by examiner

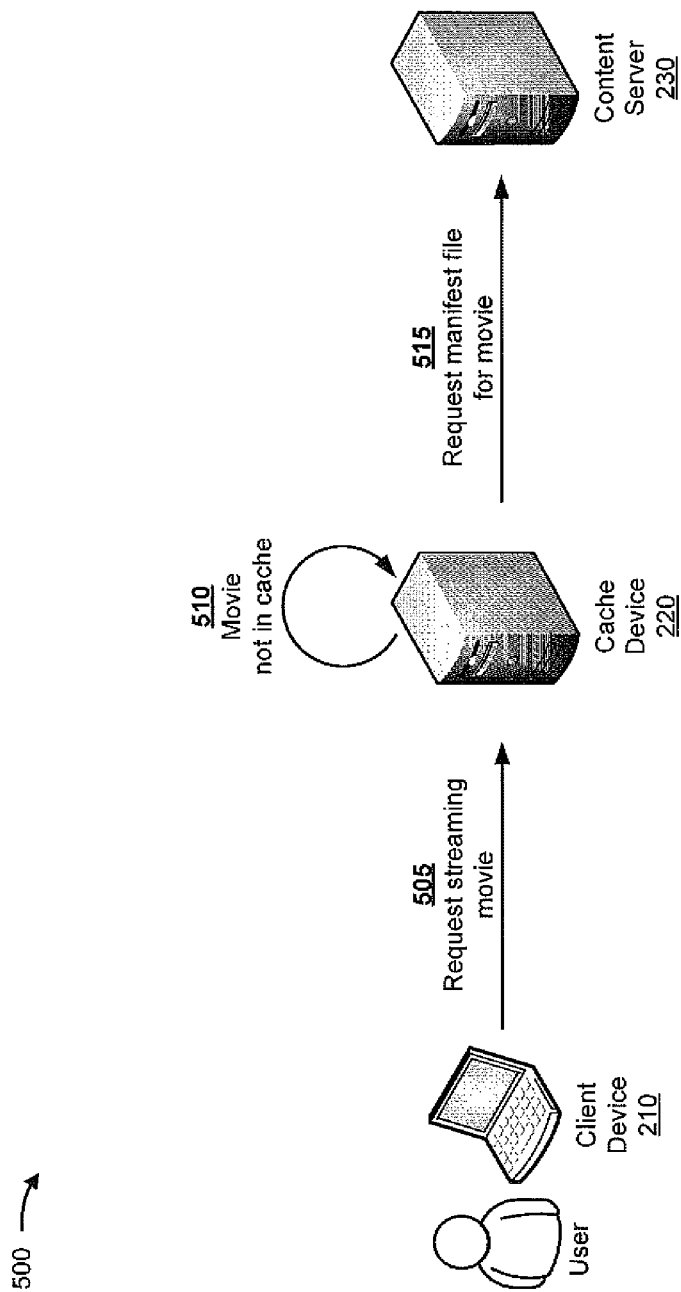

RETRIEVING AND CACHING ADAPTIVE BITRATE STREAM SEGMENTS BASED ON NETWORK CONGESTION

BACKGROUND

Adaptive bitrate streaming is a technique used to efficiently stream media over computer networks. Adaptive bitrate streaming uses an encoder to encode a single source of media (e.g., video, audio, etc.) at multiple different bitrates. A media player on a client device may request segments of the media at different bitrates depending on available resources on the client device.

BRIEF DESCRIPTION OF THE DRAWINGS

FIGS. 5A-5C are diagrams of an example implementation relating to the example process shown in FIG. 4;

DETAILED DESCRIPTION OF PREFERRED EMBODIMENTS

The following detailed description of example implementations refers to the accompanying drawings. The same reference numbers in different drawings may identify the same or similar elements.

A client device may use adaptive bitrate streaming to enhance a user's experience when playing a media stream, such as a video stream or an audio stream. Adaptive bitrate streaming is a technique where the media stream is encoded at multiple different bitrates, and each different bitrate stream is partitioned into segments that correspond to different time intervals of the media stream. The client device may request segments with a particular bitrate depending on available resources on the client device (e.g., bandwidth, processing power, etc.) or the connecting network. For example, when available resources are low, the client device may request low bitrate segments so that playback of the media stream is not interrupted. On the other hand, when available resources are high, the client device may request high bitrate segments to increase the quality of the stream (e.g., to higher definition video and/or audio).

While the client device may have an indication of the client device's own resource conditions, the client device may not have a direct indication of the network conditions of the network via which the media stream is being delivered (e.g., the client device may have an inferred indication and/or a limited view of the network based on the ability of the network to satisfy requests from the client device). Thus, the client device may request high bitrate segments when the network is congested, leading to further network congestion. Implementations described herein take network conditions into account when determining a bitrate for segments to be delivered to the client device. In this way, network congestion may be alleviated, and a user of the client device may have a better experience when viewing and/or listening to a media stream.

Figure 1A:
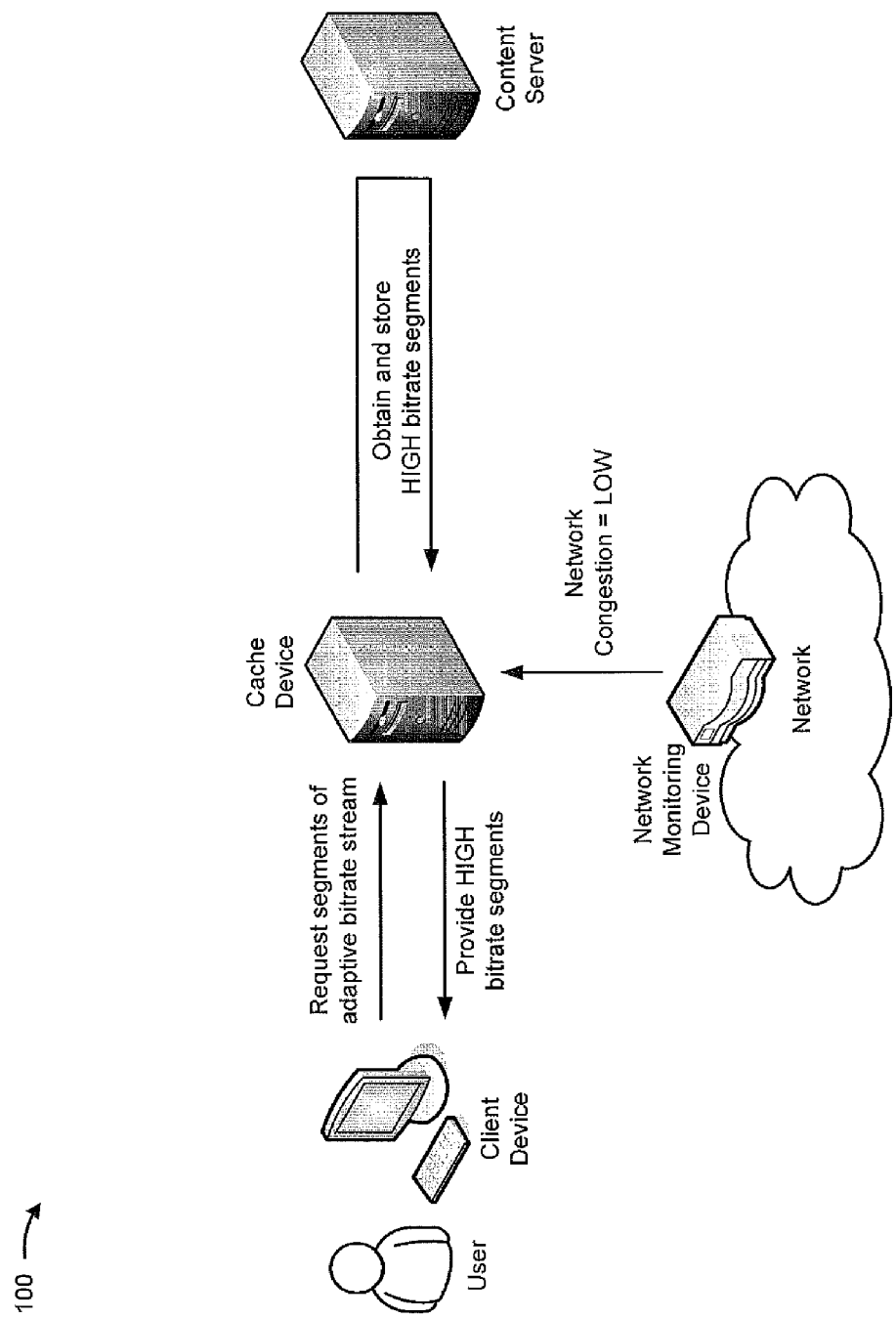
FIGS. 1A and 1B are diagrams of an overview of an example implementation described herein.
Figure 1B:
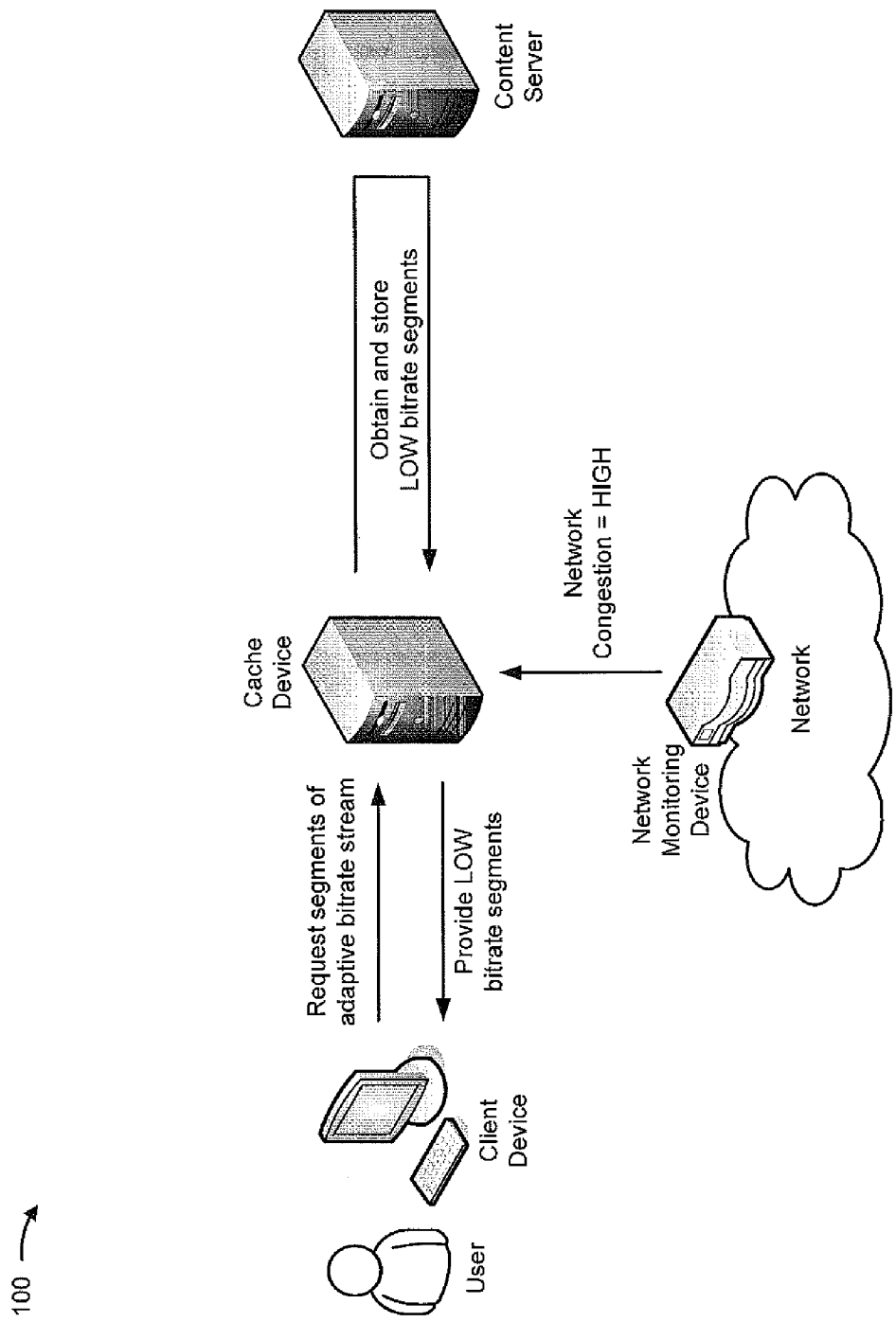

FIGS. 1A and 1B are diagrams of an overview of an example implementation 100 described herein. As shown in FIG. 1A, a user may interact with a client device to request segments of an adaptive bitrate stream, such as an adaptive bitrate video. The request may be sent to a cache device that temporarily stores segments obtained from a content server. Within a network, the client device may be positioned closer to the cache device than the content server, so that network resources may be preserved. The cache device may check to see if the requested segments are stored locally on the cache device, and if so, may provide the requested segments to the client device. If the requested segments are not stored on the cache device, then the cache device may obtain the requested segments from the content server, which may store all of the segments at all of the available bitrates.

As further shown in FIG. 1A, the cache device may receive information regarding network congestion from a network monitoring device. The cache device may determine a bitrate for segments to be provided to the client device based on the network congestion and based on the bitrate requested by the client device, and may obtain segments of that bitrate prior to receiving a request for the segments from the client device. As shown in FIG. 1A, if the cache device receives an indication that network congestion is low, then the cache device may obtain and store high bitrate segments, and may provide the high bitrate segments to the client device for playback.

As shown in FIG. 1B, assume that at a later time, the cache device receives an indication, from the network monitoring device, that network congestion is high. Based on this indication, the cache device may begin obtaining and storing low bitrate segments from the content server. The cache device may obtain segments expected to be requested by the client device. For example, if the client device recently requested a segment that includes the 10th minute of a movie, then the cache device may request low bitrate segments corresponding to minutes 10 through 20 of the movie, and may provide those low bitrate segments to the client device upon request (e.g., regardless of the bitrate requested by the client device). In this way, the cache device may alleviate congestion in the network by requesting smaller files when the network is congested. Furthermore, the cache device may enhance the user's experience by preparing for network congestion and increasing the chances that the client device will be able to continue to receive a requested media stream.

Figure 2:
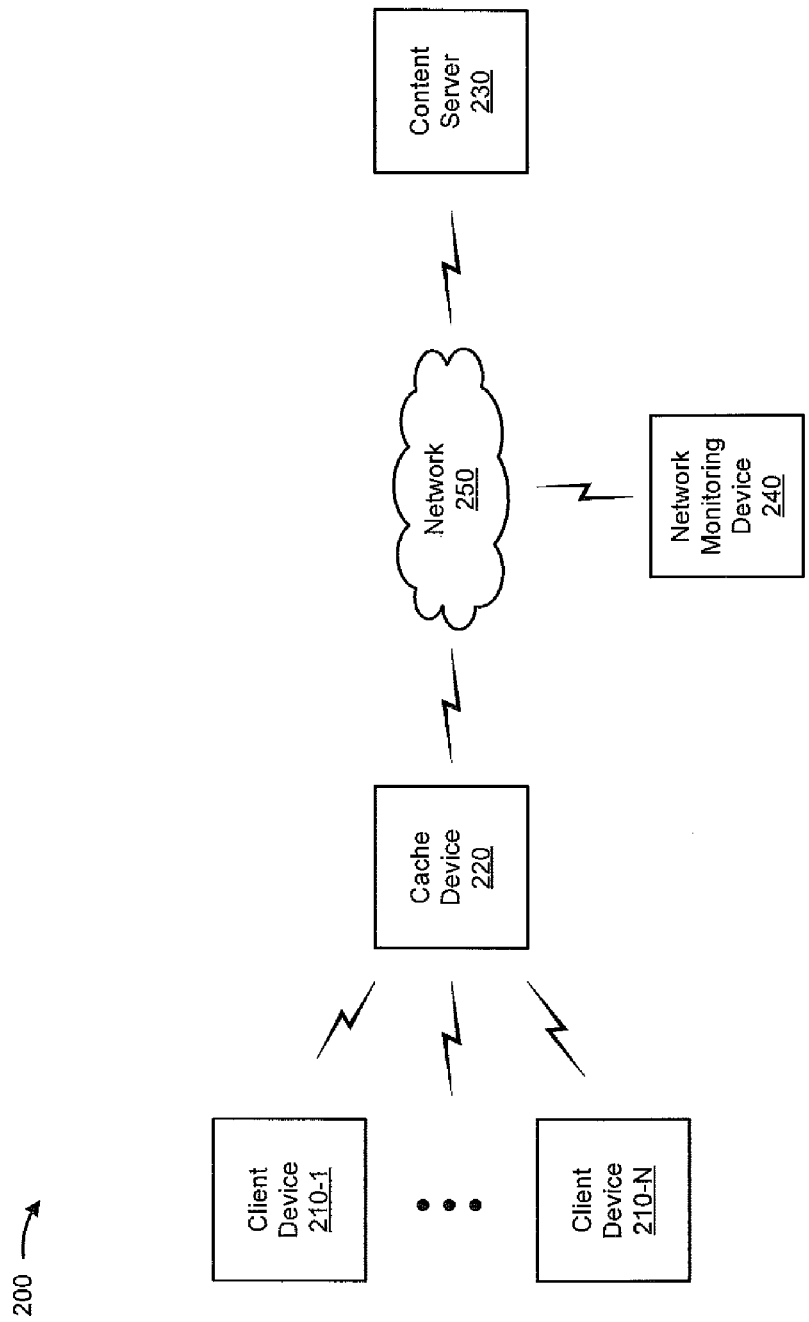
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more client devices 210-1 through 210-N (N≥1) (hereinafter referred to individually as "client device 210," and collectively as "client devices 210"), a cache device 220, a content server 230, a network monitoring device 240, and a network 250. Devices of environment 200 may interconnect via wired connections, wireless connections, or a combination of wired and wireless connections.

Client device 210 may include one or more devices capable of receiving, storing, processing, and/or providing a media stream (e.g., a video stream, an audio stream, etc.). For example, client device 210 may include a desktop computer, a laptop computer, a tablet computer, a mobile phone, a set-top box, an audio playback device, a video playback device, a device equipped with a media player, or a similar device. Client device 210 may request an adaptive bitrate media stream by requesting, in sequential order, segments of the media stream (e.g., using HyperText Transfer Protocol (HTTP) Live Streaming (HLS), Dynamic Adaptive Streaming over HTTP (DASH), HTTP Dynamic Streaming, Microsoft Smooth Streaming, or the like). The request may be transmitted to cache device 220 and/or content server 230 (e.g., via network 250). For example, a request intended for content server 230 may be marked and routed through cache device 220. Cache device 220 and/or content server 230 may respond to the request by providing the requested segments to client device 210, and client device 210 may process the received segments for playback.

Cache device 220 may include one or more devices capable of receiving, storing, processing, and/or providing a media stream (e.g., one or more segments of an adaptive bitrate media stream). For example, cache device 220 may include a storage device, a server, or a similar device. Cache device 220 may receive, from client device 210, one or more requests for a segment of the media stream. If the requested segment is stored by cache device 220, then cache device 220 may provide the requested segment to client device 210. If the requested segment is not stored by cache device 220, then cache device 220 may obtain the segment from content server 230 (e.g., by requesting and receiving the segment), may store the segment, and may provide the segment to client device 210. Cache device 220 may store the segment (e.g., for a particular period of time) so that the segment is available on cache device 220 for client device 210 and/or other client devices 210. In some implementations, cache device 220 may discard the segment (e.g., delete the segment from memory) after a particular amount of time has passed without receiving a request for the segment. Cache device 220 may receive network congestion information from network monitoring device 240, and may use the congestion information to determine a set of segments to request, from content server 230, and cache.

Content server 230 may include one or more devices capable of receiving, generating, storing, processing, and/or providing a media stream (e.g., one or more segments of an adaptive bitrate media stream). For example, content server 230 may include a storage device, a server (e.g., a host server, a web server, an HTTP server, etc.), or a similar device. Content server 230 (or a group of content servers 230) may store all segments of a media stream (e.g., a movie, a song, a video, etc.), and may store multiple different files for one or more of the segments. A particular segment may include content corresponding to a particular time interval of the media stream (e.g., 10 consecutive seconds of the media stream) encoded at a particular bitrate. The same time interval of the media stream may be encoded using different bitrates, and each differently-encoded time interval may be stored as a file on content server 230. Content server 230 may receive requests for one or more segments (e.g., from cache device 220 and/or client device 210), and may provide the one or more requested segments.

Network monitoring device 240 may include one or more devices capable of receiving, storing, determining, processing, and/or providing congestion information that indicates a congestion level of a network. For example, network monitoring device 240 may include a server, a gateway, a router, a firewall, a network tap, a base station, a packet sniffer, or a similar device. Network monitoring device 240 may monitor a network (e.g., network 250 or another network) to determine the congestion information. Additionally, or alternatively, network monitoring device 240 may monitor one or more devices connected to the network (e.g., one or more of client device 210, cache device 220, content server 230, or another device; a group of devices separate from or including client device 210, cache device 220, and/or content server 230; etc.) to determine the congestion information. Network monitoring device 240 may provide the congestion information to cache device 220, and cache device 220 may use the congestion information to determine one or more segments to obtain from content server 230.

While shown as separate from cache device 220 and content server 230, network monitoring device 240 may be included in, and a part of, cache device 220 and/or content server 230, in some implementations. Additionally, or alternatively, network monitoring device 240 may be positioned between cache device 220 and client device 210, in some implementations (e.g., where network monitoring device 240 is a base station that connects client device 210 to network 250).

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
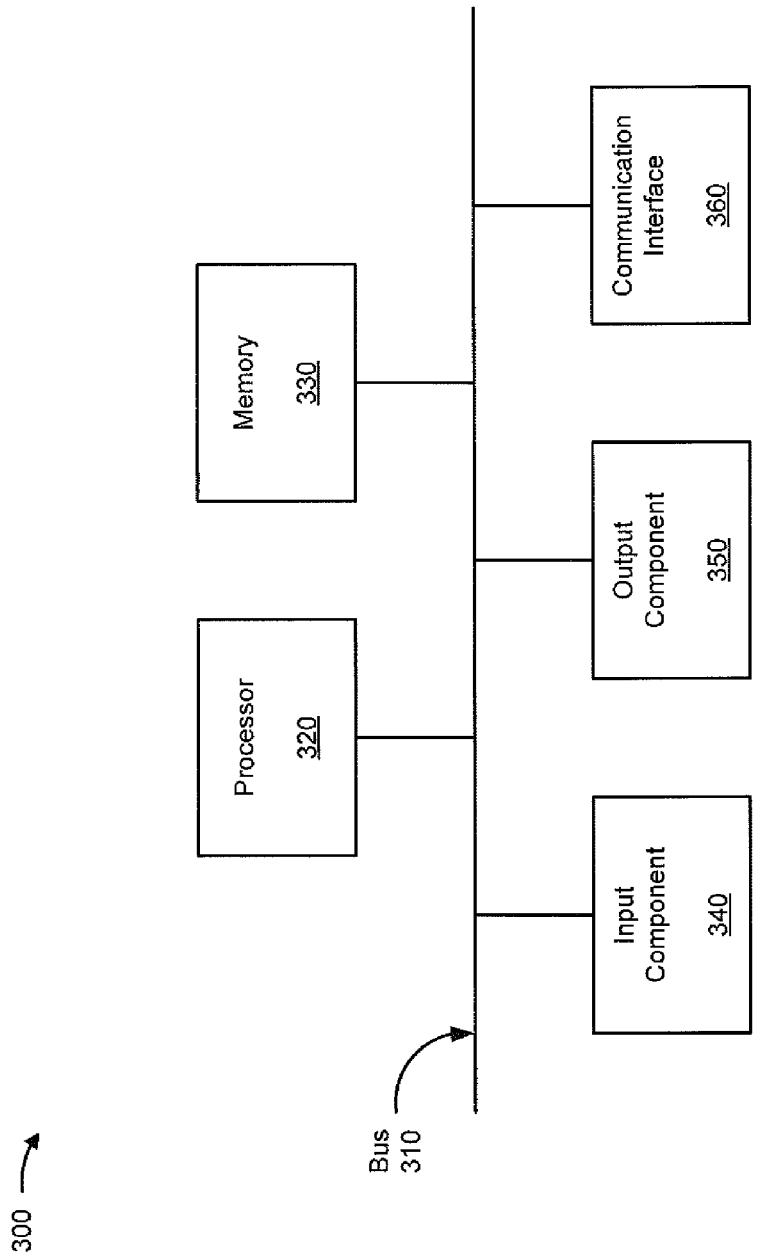
FIG. 3 is a diagram of example components of one or more devices of FIG. 2.

FIG. 3 is a diagram of example components of a device 300. Device 300 may correspond to client device 210, cache device 220, content server 230, and/or network monitoring device 240. Additionally, or alternatively, each of client device 210, cache device 220, content server 230, and/or network monitoring device 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a component that permits communication among the components of device 300. Processor 320 may include a processor, a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or any type of dynamic or static storage device (e.g., a flash memory, a magnetic memory, an optical memory, etc.) that stores information and/or instructions for use by processor 320.

Input component 340 may include a component that permits a user to input information to device 300 (e.g., a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency (RF) interface, a universal serial bus (USB) interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
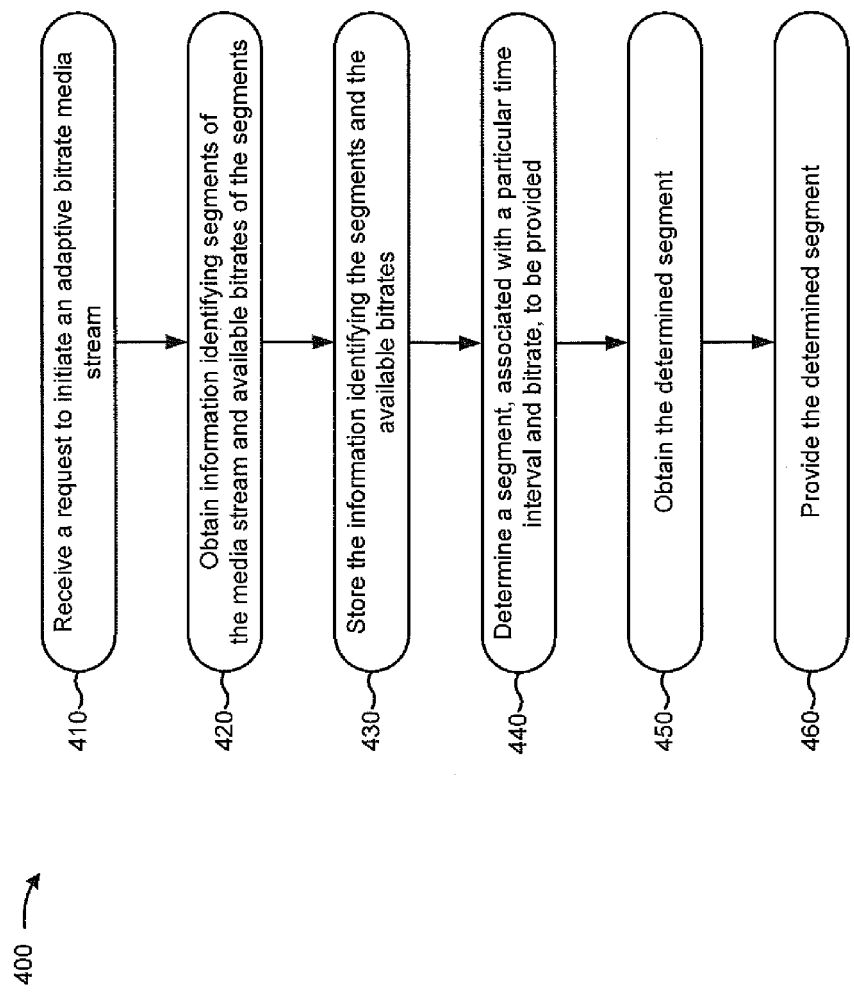
FIG. 4 is a flow chart of an example process for setting up an adaptive bitrate session that may be adapted to network congestion.

FIG. 4 is a flow chart of an example process 400 for setting up an adaptive bitrate session that may be adapted to network congestion. In some implementations, one or more process blocks of FIG. 4 may be performed by cache device 220. In some implementations, one or more process blocks of FIG. 4 may be performed by another device or a group of devices separate from or including cache device 220, such as client device 210, content server 230, and/or network monitoring device 240.

As shown in FIG. 4, process 400 may include receiving a request to initiate an adaptive bitrate media stream (block 410), and obtaining information identifying segments of the media stream and available bitrates of the segments (block 420). For example, cache device 220 may receive, from client device 210, a request to initiate an adaptive bitrate media stream. The request may include, for example, an HTTP request (e.g., an HTTP GET method).

Based on receiving the request, cache device 220 may obtain information identifying segments of the media stream and available bitrates of the segments. Cache device 220 may obtain this information from content server 230 and/or from a memory accessible by cache device 220 (e.g., where cache device 220 has previously received the information from content server 230). For example, content server 230 may store multiple versions of a media stream, with each version being encoded using a different bitrate. A single version of the media stream may be divided into multiple segments that, when processed in sequence, play back the entire media stream. Each segment may include contents that correspond to a particular time interval (e.g., a start time and a stop time) of the media stream. For example, a one minute video may be divided into six segments that are each ten seconds in length. Thus, a single segment may be associated with a particular time interval of the media stream and a particular bitrate at which the media stream is encoded.

Content server 230 may store a manifest file (e.g., an HLS manifest file, a DASH Media Presentation Description (MPD) file, etc.) that includes information that identifies all available segments, all available bitrates for the segments, and segment identifiers for requesting segments associated with different time intervals and/or bitrates. A segment identifier may include, for example, a uniform resource locator (URL) that points to a file that includes contents of a particular time interval of a media stream encoded at a particular bitrate. Cache device 220 may request a segment of a particular time interval and bitrate by providing a request, to content server 230, that includes the segment identifier. Similarly, client device 210 may request, from cache device 220 and/or content server 230, the segment using the segment identifier.

As further shown in FIG. 4, process 400 may include storing the information identifying the segments and the available bitrates (block 430). For example, cache device 220 may obtain the manifest file, and may store the manifest file in a memory accessible by cache device 220. In some implementations, cache device 220 may determine whether the manifest file is of a format readable by cache device 220 (e.g., based on header information, file format information, configuration information, a file extension, Multipurpose Internet Mail Extensions (MIME) information, etc.). If the manifest file is readable by cache device 220, then cache device 220 may store the manifest file. If the manifest file is not readable by cache device 220, then cache device 220 may not store the manifest file. Additionally, or alternatively, cache device 220 may provide the manifest file to client device 210.

As further shown in FIG. 4, process 400 may include determining a segment, associated with a particular time interval and bitrate, to be provided (block 440), obtaining the determined segment (block 450), and providing the determined segment (block 460). For example, cache device 220 may receive, from client device 210, a request for a particular segment. The request may identify the segment via a URL, and the segment may be associated with a particular time interval of the media stream encoded at a particular bitrate. Cache device 220 may obtain the requested segment (e.g., from a memory accessible by cache device 220 and/or from content server 230), and may provide the requested segment to client device 210. Cache device 220 may store (e.g., may cache) the segment, so that cache device 220 may provide the segment to one or more client devices 210 that request the segment. Additionally, or alternatively, cache device 220 may determine a segment to be provided based on congestion information that indicates a congestion level of a network, as described in more detail herein in connection with FIG. 6.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
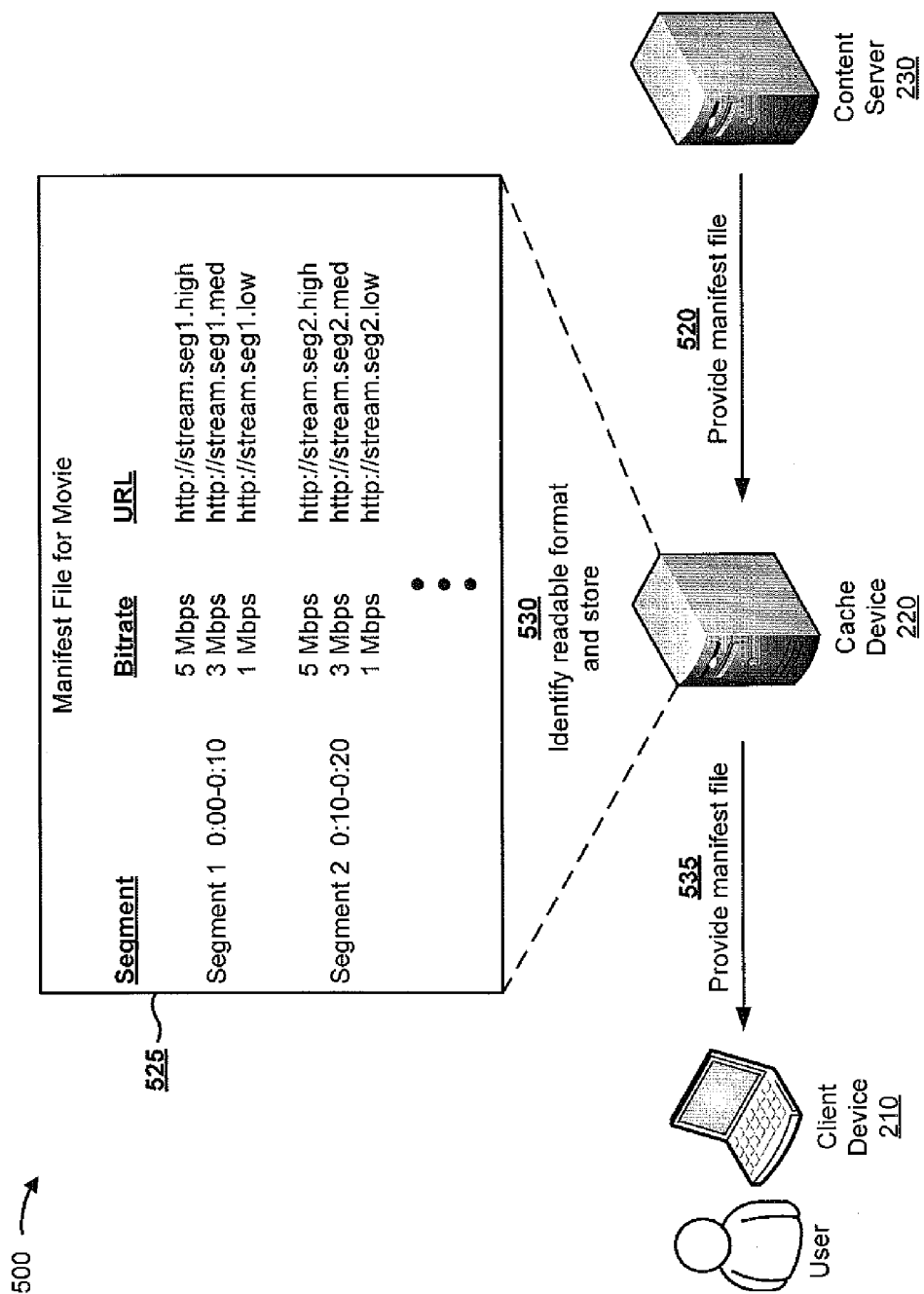
Figure 5C:
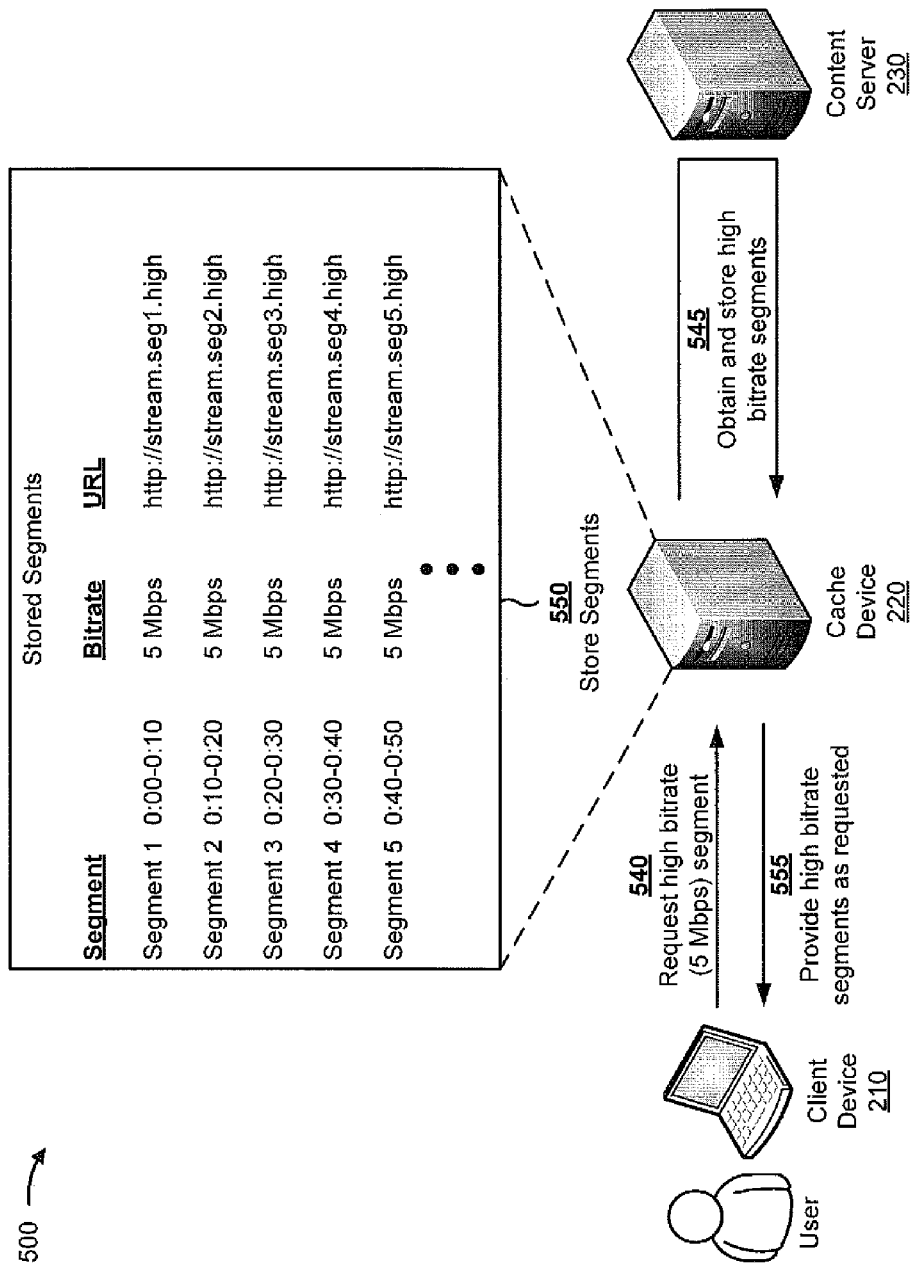

FIGS. 5A-5C are diagrams of an example implementation 500 relating to example process 400 shown in FIG. 4. FIGS. 5A-5C show an example of initiating an adaptive bitrate streaming session.

As shown in FIG. 5A, assume that a user interacts with client device 210 to request that a movie be streamed to client device 210. For example, the user may interact with a browser, a media player, etc., to request the streaming movie. As shown by reference number 505, client device 210 sends the request to cache device 220. As shown by reference number 510, assume that cache device 220 determines that the movie is not stored by cache device 220 (e.g., that a manifest file is not stored by cache device 220, that one or more segments of the movie are not stored by cache device 220, etc.). Based on this determination, cache device 220 requests the manifest file for the movie from content server 230, as shown by reference number 515.

As shown in FIG. 5B, and by reference number 520, content server 230 provides the manifest file to cache device 220. As shown by reference number 525, assume that the manifest file identifies segments of the movie, time intervals for the segments, available bitrates for the segments, and URLs for requesting a segment associated with a particular time interval and bitrate. As an example, client device 210 and/or cache device 220 may request the first segment of the movie (from 0 seconds to 10 seconds) with a bitrate of 5 Mbps using a URL of http://stream.seg1.high. As shown by reference number 530, assume that cache device 220 determines that the manifest file is of a format readable by cache device 220, and that cache device 220 stores the manifest file based on this determination. As shown by reference number 535, assume that cache device 220 also provides the manifest file to client device 210.

As shown in FIG. 5C, and by reference number 540, assume that client device 210 requests high bitrate (e.g., 5 Mbps) segments for playback (e.g., based on resource conditions of client device 210). For example, assume that client device 210 uses the URL http://stream.seg1.high to request the first segment (0 seconds to 10 seconds) at the high bitrate. Cache device 220 receives the request and determines that the first segment with the high bitrate is not stored locally by cache device 220. Thus, as shown by reference number 545, assume that cache device 220 obtains the first high bitrate segment (e.g., Segment 1) and successive high bitrate segments (e.g., shown as Segment 2 through Segment 5) from content server 230.

As shown by reference number 550, assume that cache device 220 stores the segments so that client device 210 (and other client devices 210) may access these segments without requiring traversal of the network between cache device 220 and content server 230 after each request from client device 210. As shown by reference number 555, cache device 220 may provide the requested high bitrate segment to client device 210. Client device 210 may continue to sequentially request high bitrate segments, and cache device 220 may continue to provide such segments until cache device 220 detects network congestion, as described in more detail herein in connection with FIGS. 6 and 7A-7D.

As indicated above, FIGS. 5A-5C are provided merely as an example. Other examples are possible and may differ from what was described with regard to FIGS. 5A-5C.

Figure 6:
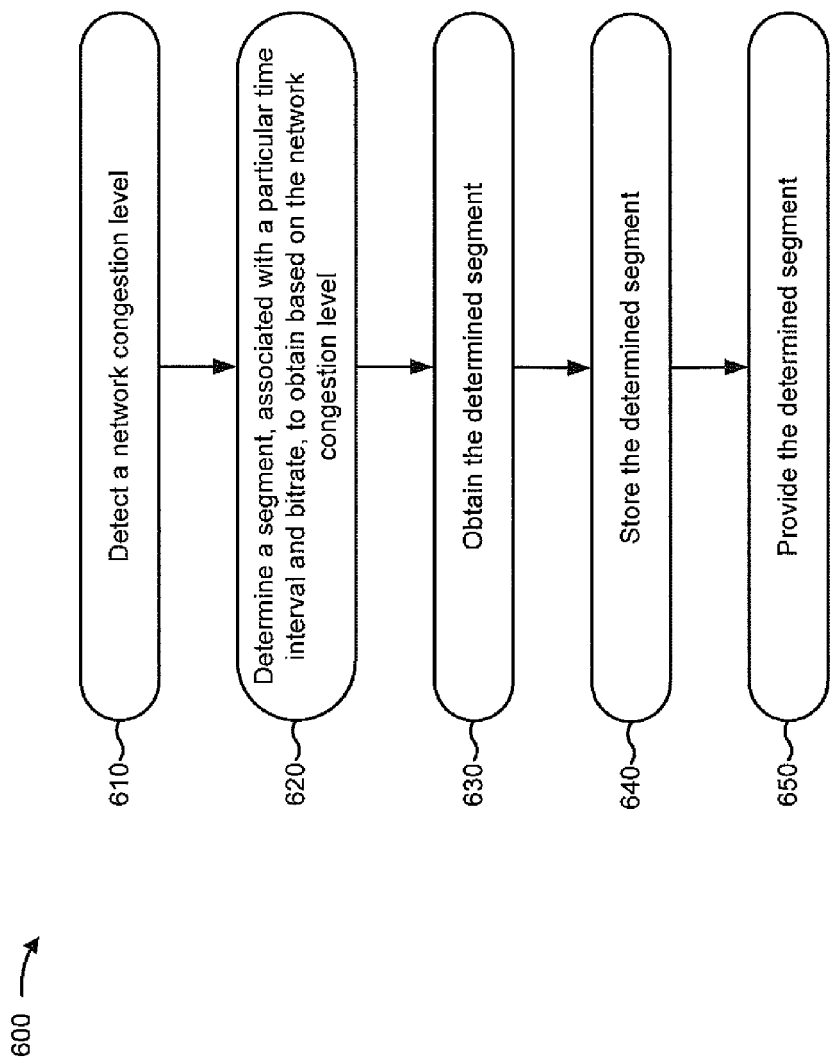
FIG. 6 is a flow chart of an example process for obtaining and caching adaptive bitrate stream segments based on network congestion.

FIG. 6 is a flow chart of an example process for obtaining and caching adaptive bitrate stream segments based on network congestion. In some implementations, one or more process blocks of FIG. 6 may be performed by cache device 220. In some implementations, one or more process blocks of FIG. 6 may be performed by another device or a group of devices separate from or including cache device 220, such as client device 210, content server 230, and/or network monitoring device 240.

As shown in FIG. 6, process 600 may include detecting a network congestion level (block 610). For example, cache device 220 may detect a network congestion level. In some implementations, cache device 220 may monitor (e.g., continuously or periodically) a network and/or a device associated with the network to determine congestion information. Additionally, or alternatively, cache device 220 may receive congestion information from another device, such as network monitoring device 240 and/or content server 230. In some implementations, network monitoring device 240 may periodically send congestion information to cache device 220. Additionally, or alternatively, network monitoring device 240 may transmit congestion information to cache device 220 when the congestion information indicates that the network congestion level has satisfied a threshold (e.g., has risen above a threshold, has dropped below a threshold, is equal to a threshold, etc.).

Congestion information may include information that indicates a congestion level (and/or a change in congestion level) of a network and/or one or more devices connected to the network. For example, congestion information may include a resource load on a network (e.g., a percentage of network resources being utilized, a quantity of network resources being utilized, a percentage of queues filled with packets, a percentage of queue capacity that is filled or unfilled, etc.), a latency associated with the network (e.g., an average latency on the network, a latency between two or more devices connected to the network, such as two or more devices shown in FIG. 2), a packet loss and/or packet loss rate associated with one or more devices, an amount of traffic associated with the network (e.g., a quantity of requests and/or packets received, processed, and/or dropped by one or more devices connected to the network), a size of a Transmission Control Protocol (TCP) window associated with one or more devices on the network (e.g., a size of a TCP receive window used by client device 210), a quantity and/or percentage of cache hits (e.g., at cache device 220), a quantity and/or percentage of cache misses (e.g., at cache device 220), a retransmission request received from client device 210, a bit error rate associated with the network, a queue depth associated with one or more devices in the network, a queue fill rate and/or queue drain rate associated with one or more devices in the network, etc.

In some implementations, cache device 220 may detect a network congestion level of a particular segment of a network. For example, cache device 220 may detect a network congestion level of a network that connects cache device 220 and client device 210. Additionally, or alternatively, cache device 220 may detect a network congestion level of a network that connects cache device 220 and content server 230. Additionally, or alternatively, cache device 220 may detect a network congestion level of a network that connects client device 210 and content server 230.

As further shown in FIG. 6, process 600 may include determining a segment, associated with a particular time interval and bitrate, to obtain based on the network congestion level (block 620). For example, cache device 220 may determine, based on the network congestion level, a bitrate and a time interval for a set of segments to be obtained and cached by cache device 220. Additionally, or alternatively, cache device 220 may determine the bitrate and/or the time interval for the set of segments to be obtained based on a bitrate and/or time interval requested by client device 210. For example, when the network becomes more congested (e.g., when the congestion level is greater than a threshold), cache device 220 may predict that client device 210 will begin requesting lower bitrate segments than those currently being requested by client device 210, and may proactively obtain these lower bitrate segments from content server 230. On the other hand, when the network becomes less congested (e.g., when the congestion level is less than a threshold), cache device 220 may predict that client device 210 will begin requesting higher bitrate segments than those currently being requested by client device 210, and may proactively obtain these higher bitrate segments from content server 230.

Cache device 220 may determine, based on the network congestion level, a time interval for a set of segments to be requested. The determined time interval may include a time interval successive to segments that have already been provided to client device 210. For example, if client device 210 has already requested and received Segments 1 through 6 (e.g., corresponding to the first minute of a media stream), then cache device 220 may request a sequence of segments starting with Segment 7 (e.g., at a different bitrate than Segments 1 through 6). In some implementations, cache device 220 may request a next sequential segment (e.g., at a different bitrate) from a segment most recently provided to client device 210. Additionally, or alternatively, client device 210 may predict (e.g., based on congestion information) a time interval of a segment that will be requested by client device 210 at a different bitrate, and may request a sequence of segments beginning with a segment at the predicted time interval.

Cache device 220 may aggregate information associated with multiple client devices 210 to determine a bitrate and a time interval for a set of segments to be requested, in some implementations. For example, cache device 220 may aggregate bitrate information at a particular time (e.g., may determine a bitrate of segments that are being requested most often by client devices 210, may determine an average bitrate of segments being requested by client devices 210, etc.), and may determine a different bitrate for segments to be obtained and cached based on the aggregate bitrate information (e.g., a different bitrate that is higher or lower than the bitrate of segments being requested most often, that is higher or lower than the average bitrate, etc., depending on network congestion). As another example, cache device 220 may aggregate time interval information at a particular time (e.g., may determine a time interval of segments that are being requested most often by client devices 210, may determine an average time interval of segments being requested by client devices 210, etc.), and may determine a time interval for segments to be obtained based on the aggregate time interval information.

Cache device 220 may determine the time interval and/or the bitrate for segments to be cached (e.g., obtained and stored) based on information stored in a data structure (e.g., a lookup table), in some implementations. For example, cache device 220 may determine congestion information, and may search a data structure using the congestion information to identify the time interval and/or the bitrate for segments to be cached. Additionally, or alternatively, cache device 220 may determine the time interval and/or the bitrate for segments to be cached based on comparing congestion information (e.g., a value that indicates a congestion level) to a threshold value.

Additionally, or alternatively, cache device 220 may determine the time interval and/or the bitrate for segments to be obtained and cached based on an algorithm. For example, cache device 220 may compute a congestion score that incorporates different types of congestion information (which may be weighted equally or differently), and may determine the time interval and/or the bitrate based on the congestion score (e.g., by comparing the congestion score to a threshold). In some implementations, cache device 220 may determine the time interval and/or the bitrate for segments to be obtained and cached based on information that identifies a decision algorithm used by a set of client devices 210 when the set of client devices 210 decide which bitrate of segments to request (e.g., a decision algorithm used most often by client devices 210).

As further shown in FIG. 6, process 600 may include obtaining the determined segment (block 630), storing the determined segment (block 640), and providing the determined segment (block 650). For example, once cache device 220 has determined the segments to be cached, cache device 220 may obtain the determined segments from content server 230, may store (e.g., cache) the segments once the segments are received from content server 230, and may provide the segments to client device 210 once the segments are requested by client device 210. In some implementations, content server 230 and/or cache device 220 may mark the segments as high priority, and the segments may be given higher priority than other traffic when being transmitted through the network by one or more network devices (e.g., because cache device 220 has taken network congestion into account when requesting the segments).

In some implementations, client device 210 may request a segment associated with a time interval and a first bitrate, and cache device 220 may provide a segment associated with the time interval and a second, different, bitrate (e.g., that is higher than or lower than the requested bitrate). For example, client device 210 may not be aware that the network is congested, and may request a high bitrate segment. Cache device 220, being aware of the network congestion, may respond to the request by providing a lower bitrate segment. In some implementations, cache device 220 may mark the segment to indicate to client device 210 that the segment is of a different bitrate than the requested bitrate. In turn, this may cause client device 210 to request subsequent segments at the second, lower, bitrate until client device 210 receives an indication that network congestion has been alleviated (e.g., based on being notified by cache device 220, based on receiving a high bitrate segment from cache device 220, etc.). In this way, cache device 220 may alleviate network congestion while continuing to provide a media stream to client device 210.

In some implementations, cache device 220 may determine a bitrate for a segment to be provided to client device 210 based on network congestion and further based on the bitrate requested by client device 210. For example, cache device 220 may treat a bitrate requested by client device 210 as the maximum possible bitrate for a segment to be provided to client device 210. In this way, cache device 220 may prevent client device 210 from being overloaded with high bitrate segments when client device 210 is low on resources (e.g., when client device 210 has a low bandwidth).

In some implementations, cache device 220 may receive a retransmission request, from client device 210, and may determine a segment to be provided to client device 210 based on the retransmission request. For example, the retransmission request may identify a requested bitrate associated with the segment. In some implementations, cache device 220 may determine whether to provide the requested segment or a segment with a different bitrate (e.g., a lower bitrate) to client device 210 based on the retransmission request.

For example, cache device 220 may determine whether the segment with the different bitrate is stored by cache device 220. If the segment with the different bitrate is stored by cache device 220, then cache device 220 may provide the segment with the different bitrate to client device 210 based on the retransmission request. If the segment with the different bitrate is not stored by cache device 220, then cache device 220 may provide the requested segment, with the requested bitrate, to client device 210. In this case, the retransmission timeout window may not permit cache device 220 to obtain the segment with the different bitrate from content server 230 before the retransmission timeout window lapses.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7D are diagrams of an example implementation relating to the example process shown in FIG. 6. FIGS. 7A-7D show an example of obtaining and caching adaptive bitrate segments based on network congestion.

Figure 7A:
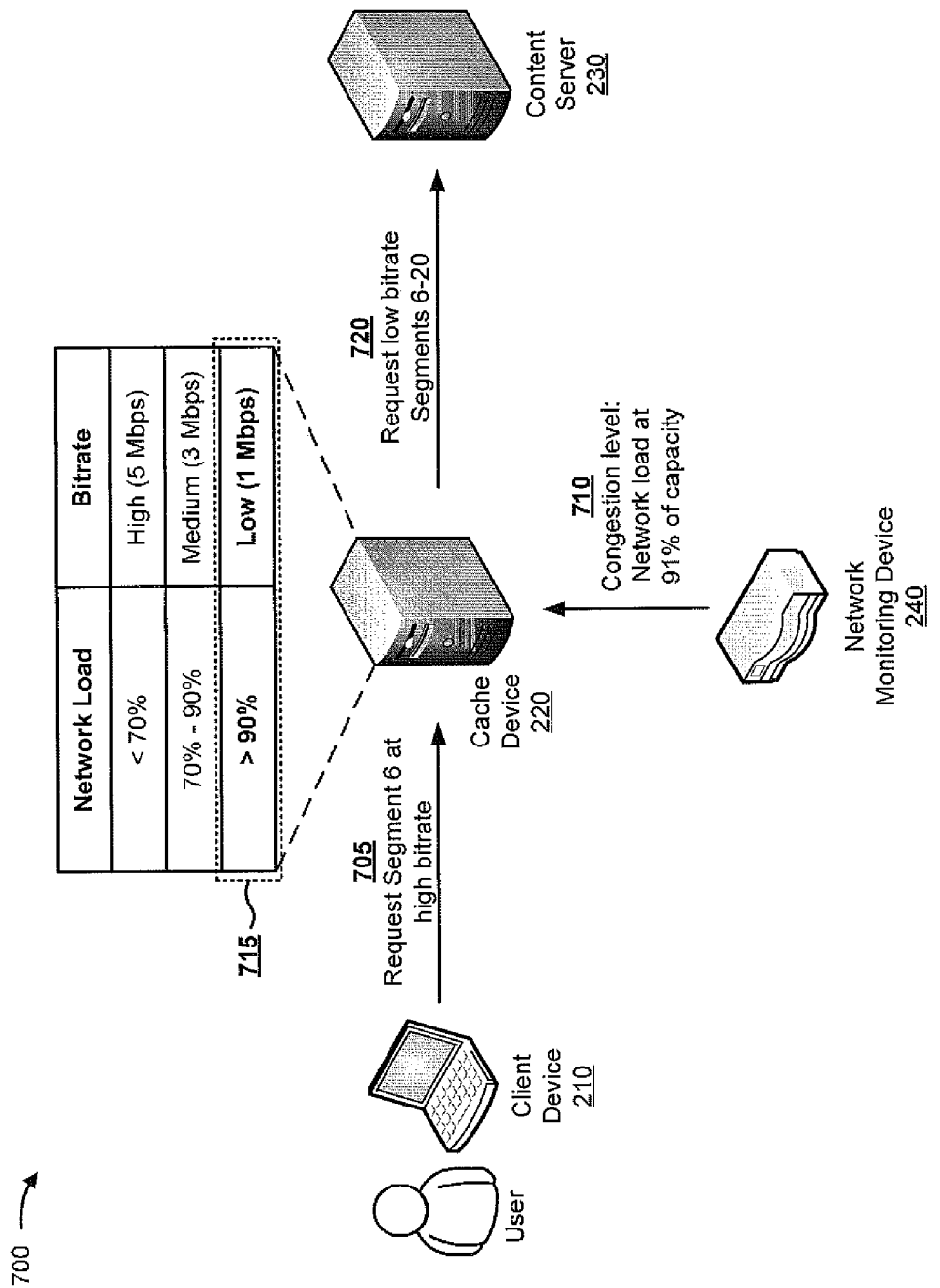
FIGS. 7A-7D are diagrams of an example implementation relating to the example process shown in FIG. 6.

As shown in FIG. 7A, assume that client device 210 has already requested and received Segments 1 through 5 of a movie, and that client device 210 is now requesting Segment 6 at a high bitrate (e.g., 5 Mbps). As shown by reference number 705, client device 210 sends the request for high bitrate Segment 6 to cache device 220. As shown by reference number 710, assume that cache device 220 receives congestion information from network monitoring device 240, and the congestion information indicates that network traffic is at 91% of capacity. As shown by reference number 715, assume that cache device 220 uses a lookup table to determine that when network load is greater than 90% of capacity, then cache device 220 is to begin caching low bitrate segments (e.g., 1 Mbps). Further, assume that cache device 220 determines, based on the congestion information, to begin caching the segment currently being requested (e.g., Segment 6), and that fifteen segments are to be requested (e.g., Segments 6 through 20). As shown by reference number 720, cache device 220 requests low bitrate Segments 6 through 20 from content server 230.

Figure 7B:
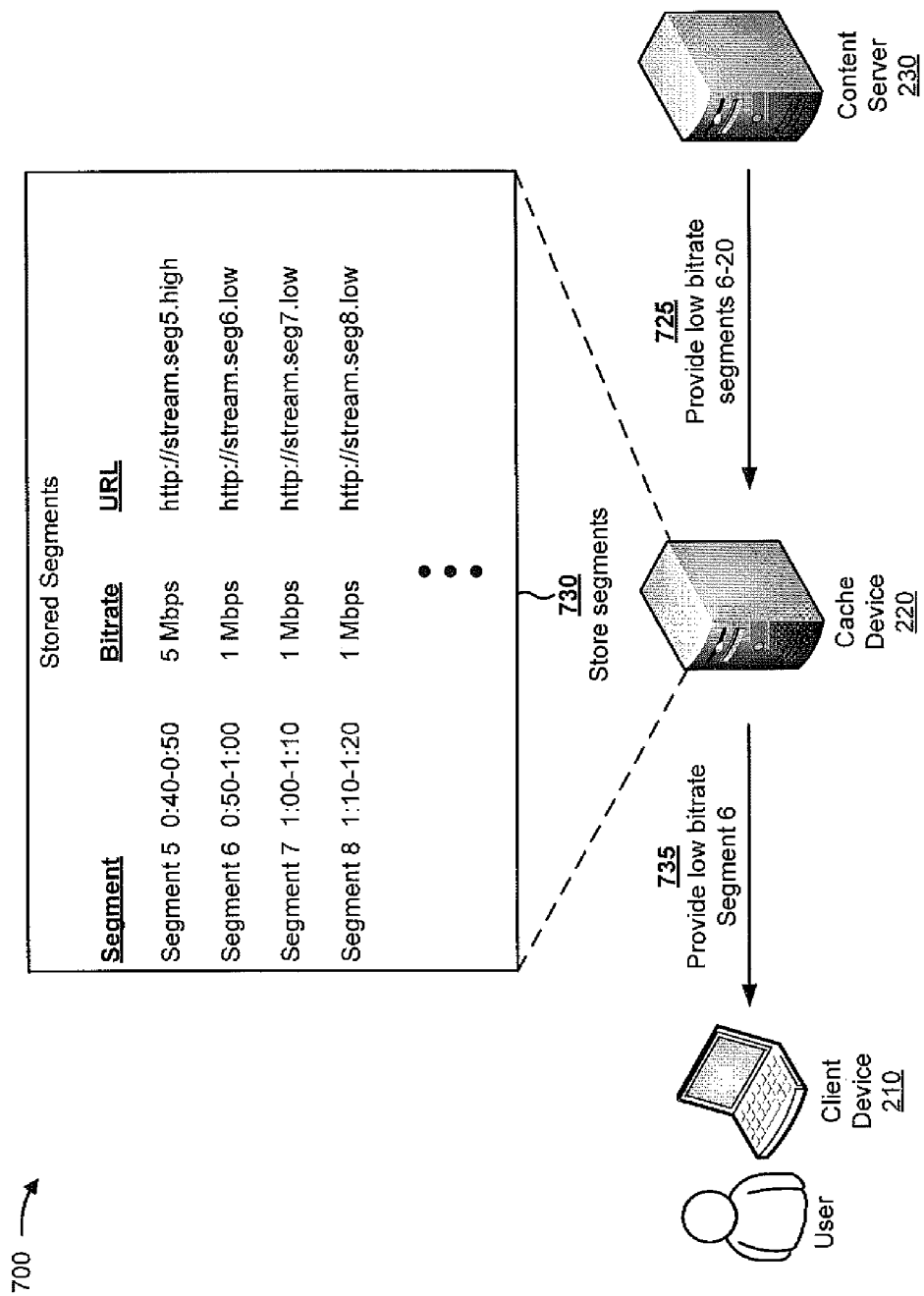

As shown in FIG. 7B, and by reference number 725, content server 230 provides low bitrate Segments 6 through 20 to cache device 220. As shown by reference number 730, assume that cache device 220 stores the segments so that client device 210 (and other client devices 210) may access these segments without requiring additional traversal of the network between cache device 220 and content server 230 after each request from one or more client devices 210. As shown by reference number 735, cache device 220 may provide low bitrate Segment 6 to client device 210, rather than providing the requested high bitrate Segment 6. Client device 210 may continue to sequentially request segments (e.g., high bitrate or low bitrate), and cache device 220 may continue to provide low bitrate segments until cache device 220 detects that network congestion has been alleviated.

Figure 7C:
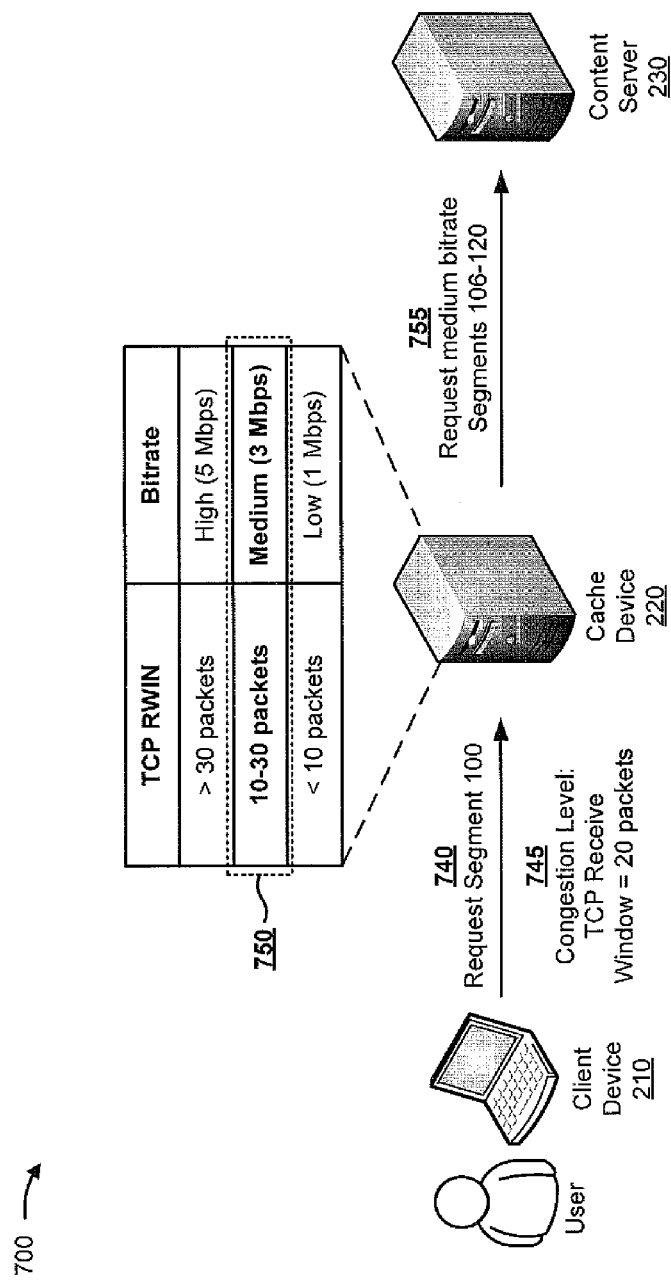

FIG. 7C shows another technique that cache device 220 may use to determine network congestion. For the purpose of FIG. 7C, assume that client device 210 has already requested and received Segments 1 through 99 of a movie, with segments 6 through 99 being received at the low bitrate initiated as described above in connection with FIGS. 7A and 7B. As shown by reference number 740, assume that client device 210 is now requesting Segment 100. Further, as shown by reference number 745, assume that client device 210 provides an indication to cache device 220 that the size of a TCP receive window (RWIN) of client device 210 is equal to 20 packets.

As shown by reference number 750, assume that cache device 220 uses a lookup table to determine that when the size of TCP RWIN is equal to 20 packets (e.g., between 10 and 30 packets), then cache device 220 is to begin caching medium bitrate segments (e.g., 3 Mbps). Further, assume that cache device 220 determines, based on the congestion information received from client device 210, to begin caching a segment that corresponds to a time interval that is six segments ahead of the segment currently being requested, and that fifteen segments are to be requested. Thus, as shown by reference number 755, cache device 220 requests medium bitrate Segments 106 through 120 from content server 230 (e.g., since Segment 106 is six segments ahead of the currently requested segment, Segment 100).

Figure 7D:
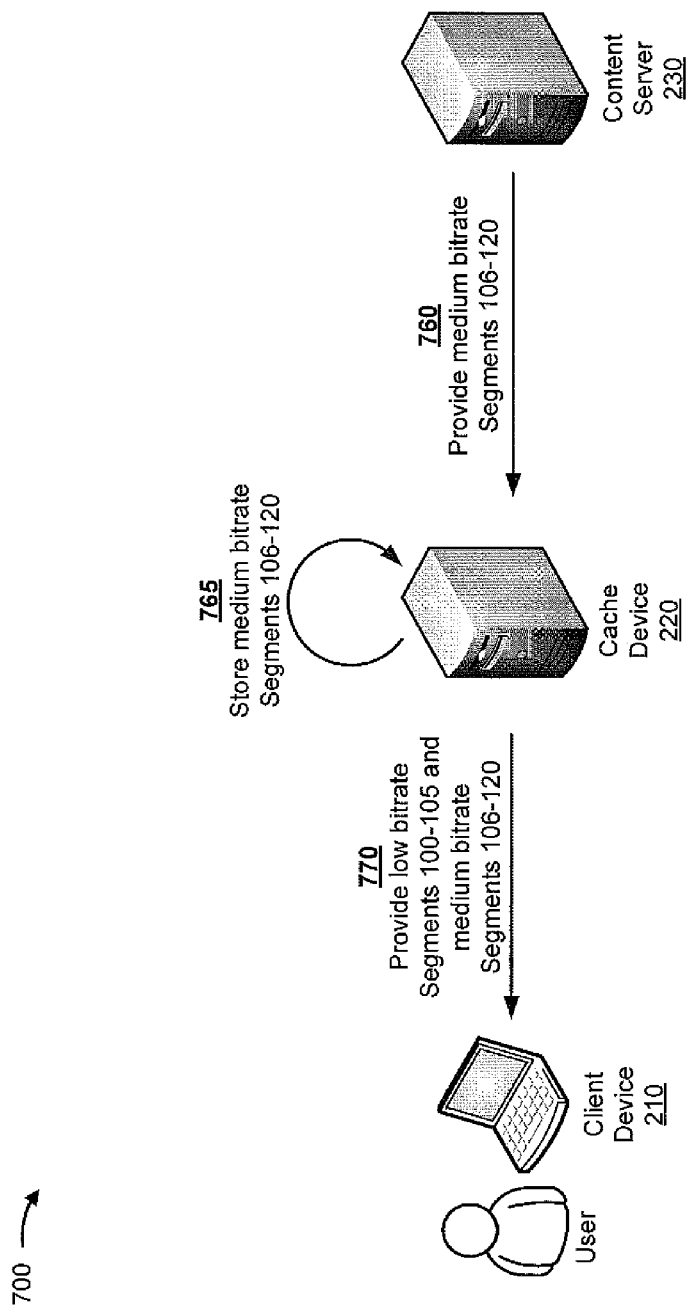

As shown in FIG. 7D, and by reference number 760, content server 230 provides medium bitrate Segments 106 through 120 to cache device 220. As shown by reference number 765, cache device 220 stores (e.g., caches) the segments. As shown by reference number 770, cache device 220 continues to provide low bitrate Segments 100 through 105 to client device 210 (e.g., as client device 210 requests Segments 100 through 105). When client device 210 requests Segment 106, cache device 220 begins to provide medium bitrate segments 106 through 120 to client device 210 (e.g., based on requests for Segments 106 through 120). In this way, cache device 220 may proactively respond to fluctuations in network congestion, may predict which adaptive bitrate media stream segments will be requested by client device 210, and may cache the predicted segments to alleviate network congestion and enhance a user's experience with a media stream.

As indicated above, FIGS. 7A-7D are provided merely as an example. Other examples are possible and may differ from what was described with regard to FIGS. 7A-7D.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used.

Further, the phrase "based on" is intended to mean "based, at least in part, on" unless explicitly stated otherwise.

What is claimed is:

1. A cache device, comprising:
one or more processors to:
receive, from a client device, a first request for a first segment of an adaptive bitrate stream,
the first segment including content corresponding to a particular time interval of the adaptive bitrate stream, and
the request identifying a first bitrate at which the first segment is encoded;
receive, from a network monitoring device, congestion information that indicates a network congestion level of a network associated with the cache device;
predict that other content corresponding to the adaptive bitrate stream is likely to be requested by the client device or another client device;
determine, based on the network congestion level and predicting that the other content is likely to be requested, a second segment to be requested from a content server,
the second segment being encoded at a second bitrate that is different from the first bitrate;
send a second request for the second segment encoded at the second bitrate to the content server based on the first request received from the client device for the first segment encoded at the first bitrate;
obtain the second segment from the content server based on the second request; and
cache the second segment for providing to the client device or another client device.

2. The cache device of claim 1, where the second segment includes the other content, the other content corresponding to a different time interval than the particular time interval; and
where the one or more processors are further configured to:
receive a request for a segment corresponding to the different time interval,
the request, for the segment corresponding to the different time interval, identifying a bitrate other than the second bitrate; and
provide, based on receiving the request for the segment corresponding to the different time interval, the second segment.

3. The cache device of claim 1, where the one or more processors are further configured to:
provide the second segment to the client device; and
provide information identifying the second bitrate to the client device,
the information identifying the second bitrate causing the client device to request an additional segment encoded at the second bitrate.

4. The cache device of claim 1, where the second segment includes the other content, and
the other content corresponding to a later time interval than the particular time interval,
the later time interval occurring after the particular time interval in the adaptive bitrate stream.

5. The cache device of claim 1, where the first bitrate is higher than the second bitrate; and
where the one or more processors, when determining the second segment, are configured to:
determine that the network congestion level is greater than or equal to a threshold; and
determine the second segment based on determining that the network congestion level is greater than or equal to the threshold.

6. The cache device of claim 1, where the first bitrate is lower than the second bitrate; and
where the one or more processors, when determining the second segment, are configured to:
determine that the network congestion level is less than or equal to a threshold; and
determine the second segment based on determining that the network congestion level is less than or equal to the threshold.

7. A non-transitory computer-readable medium storing instructions, the instructions comprising:
one or more instructions that, when executed by one or more processors, cause the one or more processors to:
receive a first request for a first segment of a first media stream encoded at a first bitrate,
the first segment including content corresponding to a particular time interval of the first media stream,
the first media stream being a first version of an adaptive bitrate stream;
receive, from a network monitoring device, congestion information that indicates a network congestion level of a network via which the media stream is to be provided;
predict that other content corresponding to the adaptive bitrate stream is likely to be requested;
determine a second segment of a second media stream encoded at a second bitrate based on the network congestion level, the first bitrate, and predicting that the other content is likely to be requested,
the second media stream being a second version of the adaptive bitrate stream, and
the second bitrate being different from the first bitrate;
send a second request for the second segment encoded at the second bitrate to a content server based on the first request received for the first segment encoded at the first bitrate;
receive the second segment based on requesting the second segment; and
cache the second segment for delivery to a client device.

8. The non-transitory computer-readable medium of claim 7, where the one or more instructions, when executed by the one or more processors, further cause the one or more processors to:
provide the second segment to at least one of:
a first client device from which the first request for the first segment was received; or
a second client device other than the first client device.

9. The non-transitory computer-readable medium of claim 8, where the one or more instructions, that cause the one or more processors to provide the second segment, cause the one or more processors to:
mark the second segment as a high priority segment,
marking the second segment as a high priority segment causing one or more network devices to treat the second segment with a higher priority than other traffic.

10. The non-transitory computer-readable medium of claim 7, where the one or more instructions, when executed by the one or more processors, further cause the one or more processors to:
receive a plurality of requests, associated with the adaptive bitrate stream, from a plurality of client devices,
the plurality of requests including the first request,
the plurality of client devices including the client device; and
where the one or more instructions, that cause the one or more processors to determine the second segment, cause the one or more processors to:

determine the second segment based on the plurality of requests from the plurality of client devices.

11. The non-transitory computer-readable medium of claim 7, where the one or more instructions, when executed by the one or more processors, further cause the one or more processors to:
compare the network congestion level to a threshold; and
where the one or more instructions, that cause the one or more processors to determine the second segment, cause the one or more processors to:
determine the second segment based on comparing the network congestion level to the threshold.

12. The non-transitory computer-readable medium of claim 7, where the one or more instructions, that cause the one or more processors to receive the congestion information, cause the one or more processors to:
receive multiple indicators of the network congestion level; and
compute a congestion score based on the multiple indicators; and
where the one or more instructions, that cause the one or more processors to determine the second segment, cause the one or more processors to:
determine the second segment based on the congestion score.

13. A method, comprising:
receiving, by a cache device, a first request for a first segment of an adaptive bitrate stream,
the request identifying a particular time interval, of the adaptive bitrate stream, to which the first segment corresponds, and
the request further identifying a first bitrate at which the first segment is encoded;
receiving, by the cache device and from a network monitoring device, congestion information that indicates a network congestion level of a network associated with the adaptive bitrate stream;
predicting, by the cache device, that other content corresponding to the adaptive bitrate stream is likely to be requested;
determining, by the cache device, a second bitrate that is different from the first bitrate based on the network congestion level and predicting that the other content is likely to be requested;
sending, by the cache device, a second request for a second segment encoded at the second bitrate to a content server based on the first request for the first segment encoded at the first bitrate;
obtaining, by the cache device and via the network, a second segment of the adaptive bitrate stream based on the second request,
the second segment being encoded at the second bitrate; and
storing, by the cache device, the second segment for delivery to a client device.

14. The method of claim 13, where receiving the first request for the first segment comprises:
receiving the first request for the first segment from the client device; and
where the method further comprises:
providing the second segment to the client device based on receiving the first request for the first segment.

15. The method of claim 13, further comprising:
receiving a third request for a third segment from the client device,
the third request for the third segment identifying a different time interval, that is different than the particular time interval, and further identifying the first bitrate; and
providing the second segment to the client device based on receiving the third request for the third segment.

16. The method of claim 13, further comprising:
receiving a manifest file associated with the adaptive bitrate stream,
the manifest file identifying available time intervals and available bitrates of the adaptive bitrate stream;
storing the manifest file; and
where determining the second bitrate comprises:
determining the second bitrate using the manifest file.

17. The method of claim 16, further comprising:
determining that the manifest file is of a type that is readable by the cache device; and
where storing the manifest file comprises:
storing the manifest file based on determining that the manifest file is of the type that is readable by the cache device.

18. The cache device of claim 1, where the one or more processors, when predicting that the other content is likely to be requested, are to:
determine a sequence of segments of the adaptive bitrate stream beginning with a segment after the first segment, the sequence of segments including the second segment, and
where the one or more processors, when sending the second request, are to:
send the second request for the sequence of segments encoded at the second bitrate.

19. The cache device of claim 1, where the one or more processors are further to:
receive a manifest file associated with the adaptive bitrate stream,
the manifest file identifying available time intervals and available bitrates of the adaptive bitrate stream;
store the manifest file; and
where the one or more processors, when determining the second segment, are to:
determine the second bitrate using the manifest file.

20. The cache device of claim 19, where the one or more processors are further to:
determine that the manifest file is of a type that is readable by the cache device; and
where the one or more processors, when storing the manifest file, are to:
store the manifest file based on determining that the manifest file is of the type that is readable by the cache device.

* * * * *